United States Patent [19]

Nakata

[11] Patent Number: 5,734,471
[45] Date of Patent: Mar. 31, 1998

[54] METHOD OF ADJUSTING SAMPLE POSITION IN LIGHT WAVE INTERFERENCE APPARATUS

[75] Inventor: Masayuki Nakata, Omiya, Japan

[73] Assignee: Fuji Photo Optical Co., Ltd., Omiya, Japan

[21] Appl. No.: 759,215

[22] Filed: Dec. 5, 1996

[30]    Foreign Application Priority Data

Jan. 12, 1996   [JP]   Japan ................................ 8-021906

[51] Int. Cl.$^6$ ........................................ G01B 9/02
[52] U.S. Cl. .............................. 356/363; 356/360
[58] Field of Search ........................ 356/345, 359, 356/360, 363

*Primary Examiner*—Frank G. Font
*Assistant Examiner*—Robert Kim
*Attorney, Agent, or Firm*—Ronald R. Snider

[57] ABSTRACT

When positioning a sample, a sample position adjusting light source section with a long coherence length is inserted into an optical system, and the sample position is adjusted such that the interference fringe pattern observed becomes a predetermined pattern, whereby the position of a surface to be inspected can be easily set within a coherence range in a simple configuration in a light wave interference apparatus using light with a short coherence length. When a sample position adjusting light source section (31) is inserted into the optical system, a light beam with a long coherence length, which has been turned into divergent light, is irradiated on each of a reference surface (4a) and a surface to be inspected (5a), whereby spherical waves reach these two surfaces (4a, 5a). These two divergent light beams are respectively reflected by the reference surface (4a) and the surface to be inspected (5a) so as to become a reference light component and an inspection light component, which are then recombined together by a light-splitting surface (3a) of a beam splitter (3) while interfering with each other, thereby forming an interference fringe on a CCD (8). This interference fringe comprises a pattern of concentric circles. The sample (5) is moved by a minute distance in the optical-axis direction (B) so as to reduce the number of fringes, and then is stopped at the time when the circular interference fringe pattern disappears.

3 Claims, 3 Drawing Sheets

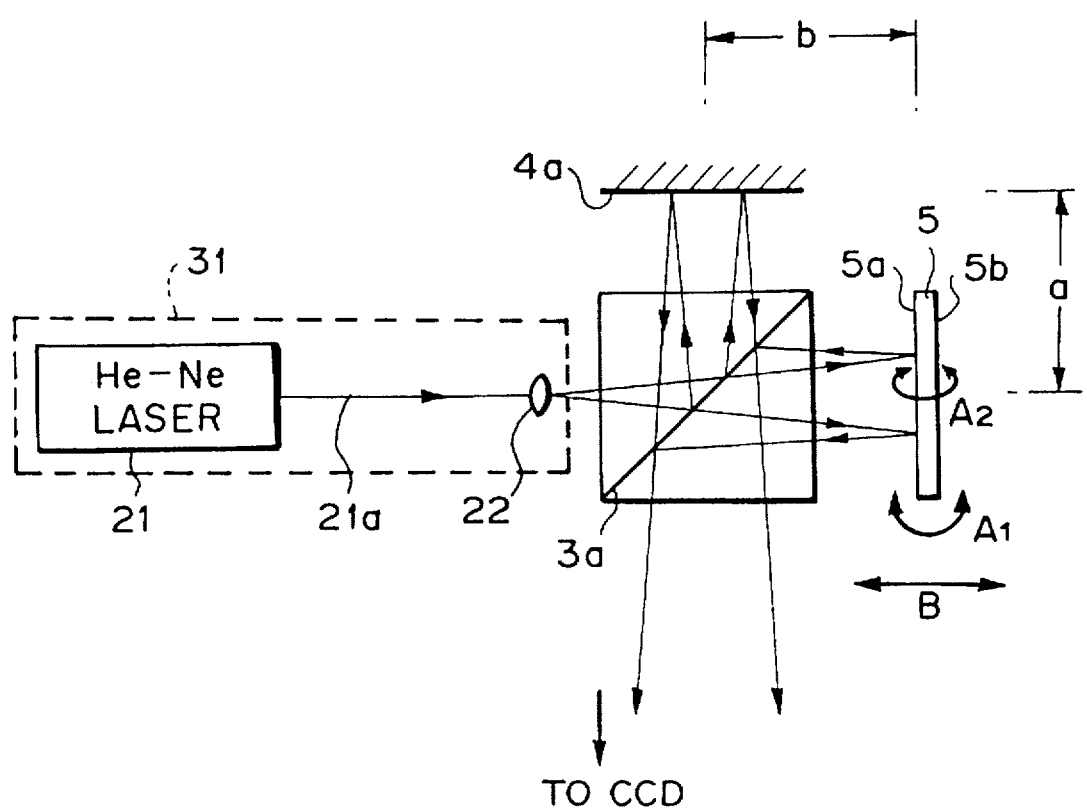
F I G. 2

INITIAL STATE

INCLINATION-MATCHED STATE

STATE WHILE MOVING IN OPTICAL-AXIS DIRECTION

OPTIMAL STATE

METHOD OF ADJUSTING SAMPLE POSITION IN LIGHT WAVE INTERFERENCE APPARATUS

RELATED APPLICATIONS

This application claims the priority of Japanese Patent Application No. 8-21906 filed on Jan. 12, 1996, which is incorporated herein by reference.

BACKGROUND OF THE INVENTION

1. Field of the Invention

The present invention relates to a method of adjusting a sample position in a light wave interference apparatus and, in particular, to such a method used, when the form of a surface to be inspected in a thin sheet-like sample is measured by use of light having a short coherence length, for positioning the surface to be inspected within a coherence range.

2. Description of the Prior Art

For example, in a Michelson type interferometer, coherent parallel light is divided by an optical dividing means into a reference light component and an inspection light component, which are then respectively reflected by a reference surface and a surface to be inspected and are thereafter recombined together by the light-dividing means, so as to subsequently fore an interference fringe on a viewing surface. As this interference fringe is observed, irregularities of the surface to be inspected and the like can be evaluated.

Here, when a laser interferometer is used as the above-mentioned interferometer, since laser light has a long coherence length, it is not necessary for the position of the surface to be inspected to be correctly set with respect to the reference surface. When a thin transparent sheet is used as a sample, however, reflected light from the rear surface of the sample also interferes with reflected light from the surface to be inspected or reflected light from the reference surface, thereby superposing an interference fringe of a noise component onto the original interference fringe.

Accordingly, when a thin sheet glass or the like is to be measured by use of a laser interferometer, it has conventionally been necessary to take such measures as application of index-matching oil to the rear surface which generates a ghost.

Nevertheless, such measures may require enormous labor, while yielding such a problem as pollution of the sample.

Also, when the matching oil or the like is applied to a very thin sample, the latter may warp due to the surface tension of the former, thereby making it difficult to measure the surface to be inspected.

Accordingly, when measuring the surface form of a thin sheet glass or the like, light having a short coherence light (having a coherence length shorter than twice the thickness t of the sample) may be used as the measurement light so as to set only the surface to be inspected within a coherence range.

In the prior art mentioned above, however, assuming that the coherence length from a light source is $S_{CL}$, coherence range L into which the sample to be inspected should be disposed becomes $L < S_{CL}/2$.

For example, when a light source having a coherence length of about 30 μm such as a red-emitting diode (LED) is used, the coherence range L becomes shorter than 15 μm. Unless the position of the surface of sample to be inspected is set within this narrow range, an interference fringe indicative of a relative form with respect to the reference plate will not be generated.

SUMMARY OF THE INVENTION

In view of the foregoing circumstances, the object of the present invention is to provide a method of adjusting a sample position in a light wave interference apparatus using light with a short coherence length, which can easily set the surface to be inspected within a coherence range in a simple configuration.

In order to attain such an object, in the method of adjusting a sample position in a light wave interference apparatus in accordance with the present invention, the light wave interference apparatus divides an observation light beam having a coherence length shorter than twice the thickness of the sample into two beams which are respectively irradiated onto a surface of the sample to be inspected and a reference surface, observes an interference fringe formed by an inspection light component from the surface to be inspected and a reference light component from the reference surface, and measures, based on the result of observation, the surface form of the surface to be inspected;

wherein, when adjusting the position of the sample so as to dispose the surface to be inspected within a coherence range of the observation light beam, a divergent sample position adjusting light beam which has a coherence length greater than twice the thickness of the sample is used in place of the observation light beam to observe the interference fringe, and the sample is moved in an optical-axis direction until the number of concentric fringes observed becomes a predetermined value or smaller.

Also, before the operation for moving the sample in the optical-axis direction, an operation for adjusting the inclination of the sample so as to move the center of the concentric interference fringe pattern to near the center of a visual field may be performed.

Further, the predetermined value includes and desirably is zero.

BRIEF DESCRIPTION OF THE DRAWINGS

FIG. 2 is a view for explaining effects in the above-mentioned embodiment; and

DETAILED DESCRIPTION OF THE PREFERRED EMBODIMENTS

In the following, an embodiment of the present invention will be explained with reference to the drawings.

Figure 1:
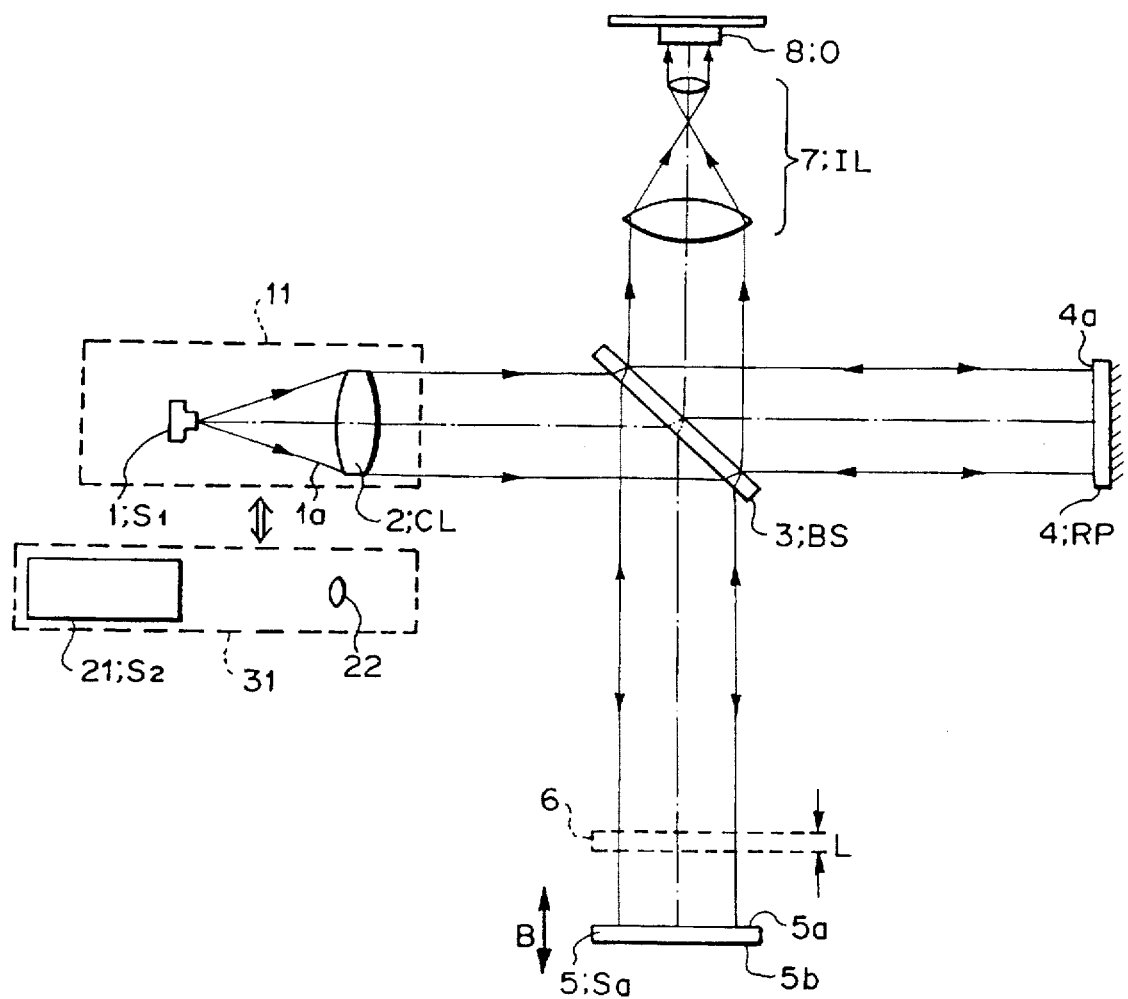
FIG. 1 is a configurational view showing an example of an apparatus for realizing the method of adjusting a sample position in accordance with an embodiment of the present invention.

FIG. 1 is a schematic view showing an example of an apparatus for realizing the method of adjusting a sample position in accordance with an embodiment of the present invention, which is applied to a Michelson type interferometer.

This Michelson type interferometer comprises an observation light source 1 made of a red LED, a collimator lens 2, a beam splitter 3, a reference plate 4, an imaging lens 7, a CCD device 8, and a non-depicted sample holding and driving mechanism.

The observation light source 1 is a light source which emits light 1a having a short coherence length (e.g., light with a coherence length of 30 μm). The light 1a emitted from the observation light source 1 is turned into parallel light by the collimator lens 2 and then divided by the beam splitter 3 into a reference light component and an inspection light component. Thereafter, these reference light component and inspection light component are respectively reflected by a reference surface 4a of the reference plate 4 and a surface to be inspected 5a of a sample 5 supported by the sample holding and driving mechanism, and then are recombined together by the beam splitter 3 so as to form an interference fringe on an imaging surface of the CCD 8 by means of the imaging lens 7.

Here, as the observation light source 1, a light source which emits the light 1a having a very short coherence length is selected such that an interference fringe noise based on reflected light from a rear surface 5b of the sample 5 is not superposed on the interference fringe formed by the reflected light from the surface to be inspected 5a of the sample 5 and the reflected light from the reference surface 4a of the reference plate 4.

When a light source emitting light with a short coherence length is thus used in an interference apparatus, it is necessary to perform a surface length matching operation in which the position of the surface to be inspected 5a in the optical-axis direction is adjusted so as to make the optical path lengths of the reference light component and inspection light component equal to each other.

Assuming that the coherence length of the light 1a is SCL, coherence range 6 (L) of the surface to be inspected 5a shown in FIG. 1 becomes L<SCL/2. Also, the coherence length SCL is set so as to become much smaller than the thickness t of the sample 5. For example, when the observation light source 1 is set such that the coherence length SCL is 30 μm as mentioned above, the coherence range 6 (L) becomes a value much smaller than 15 μm. Accordingly, when an interference fringe based on the surface to be inspected 5a of the sample 5 is observed at the time of interference fringe measurement, an interference fringe based on the rear surface 5b of the sample 5 is not observed.

Then, the sample 5 is moved in the direction of arrow B by means of the non-depicted sample holding and driving mechanism such that the surface to be inspected 5a is positioned within this coherence range 6. Nevertheless, the surface to be inspected 5a of the sample 5 is not easily positioned within such a very narrow range as the coherence range 6. In particular, when the interference fringe formed on the CCD 8 is observed, and the movement of the sample 5 is stopped at the moment the interference fringe appears, in order to effect the positioning operation; the interference fringe, at the time when it appears, also moves at a high speed in response to the movement of the surface to be inspected 5a. Consequently, confirmation of emergence of the interference fringe itself may become a very difficult operation.

Therefore, in this apparatus, as depicted, an observation light source section 11 constituted by the observation light source 1 and the collimator lens 2 and a sample position adjusting light source section 31 constituted by a sample position adjusting light source 21 and a divergent lens 22 are disposed so as to be alternatively inserted into the optical system.

Namely, the observation light source section 11 is inserted into the optical system when the form of the surface to be inspected 5a is measured by interference fringe observation, whereas the sample position adjusting light source section 31 is inserted when the position of the sample 5 is adjusted in order to position the surface to be inspected 5a within the coherence range 6.

The sample position adjusting light source 21 constituting the sample position adjusting light source section 31 comprises an He—Ne laser light source or the like which can output a light beam having a long coherence length (e.g., coherence length of several meters). The light beam output from this light source is turned into divergent light by means of the divergent lens 22.

In the following, the method of adjusting the sample position using the above-mentioned apparatus will be explained.

When the sample position adjusting light source section 31 is inserted into the optical system, a light beam with a long coherence length, which has been turned into divergent light, is irradiated on each of the reference surface 4a and the surface 5a to be inspected, whereby spherical waves reach these two surfaces 4a and 5a. Then, the reference light component and inspection light components, which are spherical waves respectively reflected by these surfaces 4a and 5a, are recombined together by the beam splitter 3, thereby forming an interference fringe on the imaging surface of the CCD 8.

Since thus formed interference fringe is based on the interference of spherical waves alone, it comprises a pattern of a number of circles formed concentrically, in which the number of concentric circles reduces as the optical path difference between the reference light component and the inspection light component is smaller, such that the fringe theoretically disappears when the optical path difference between the reference light component and the inspection light component becomes zero (a=b in FIG. 2).

When the optical path difference between the reference light component and the inspection light component is zero, the surface to be inspected 5a is located within the coherence range 6. Accordingly, when the sample 5 is held at this position, the observation light source 1 with a short coherence length can be used immediately thereafter to measure the form of the surface to be inspected 5a.

In the following, a specific method of adjusting the sample position will be explained with reference to FIGS. 2 and 3A to 3D. Here, in order to facilitate the explanation, forms and positions of constituents in the optical system of FIG. 2 are depicted differently from those in FIG. 1.

Namely, a light beam 21a with a long coherence length output from the sample position adjusting light source 21 is turned into divergent light by means of the divergent lens 22, and then divided into two divergent light beams at a light-splitting surface 3a of the beam splitter 3. These two light beams are respectively reflected by the reference surface 4a and the surface to be inspected 5a so as to become the reference light component and the inspection light component, which are then combined at the light-splitting surface 3a of the beam splitter 3 while interfering with each other to form an interference fringe on the CCD 8.

Figure 3A:
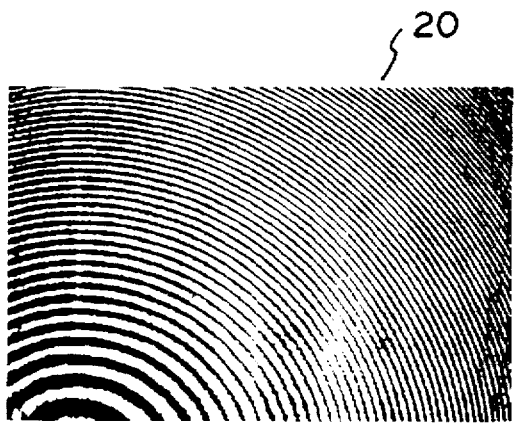
FIGS. 3A to 3D are views for explaining results of the above-mentioned embodiment.

FIG. 3A is a schematic view showing an interference fringe pattern in a state where the position of the sample 5 is not adjusted.

Though a number of circles are concentrically formed in the interference fringe pattern shown in FIG. 3A, the center of concentric circles is deviated out of the visual field since the inclination of the surface to be inspected 5a is not adjusted.

Thereafter, the sample 5 is rotated by a minute angle around two orthogonal axes (arrows A1 and A2) within its plane such that the center of the concentric circles is located at the center of the visual field. Consequently, the axial positions of both beams of the reference light component and inspection light component are matched with each other.

Figure 3B:
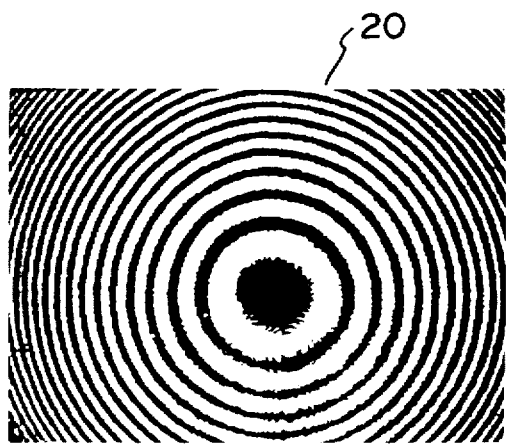

FIG. 3B shows the interference fringe pattern after this matching operation.

Then, while the interference fringe pattern on a monitor is viewed, the sample 5 is moved by a minute distance in the direction along the optical axis (directions of arrow B) in which the number of concentric circles becomes smaller.

Figure 3C:

FIG. 3C shows the interference fringe pattern in this state.

Thereafter, the sample 5 is moved by a minute distance until the circular interference fringe pattern disappears, and the movement of the sample 5 is stopped at the time when the circular interference fringe pattern disappears.

Figure 3D:
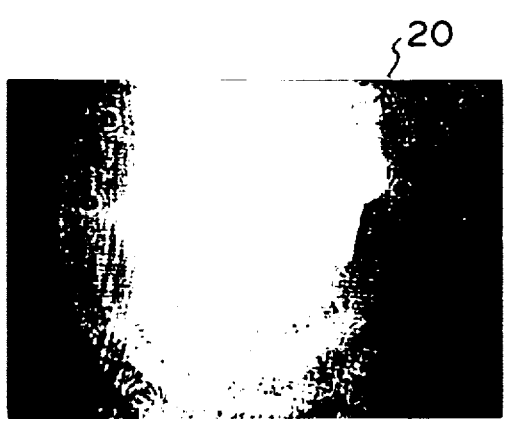

FIG. 3D shows the interference fringe in this state. Here, in this state, when the inclination adjustment is incomplete, a thick linear interference fringe appears or the whole visual field becomes black or white.

Thus, the adjustment of the position of the sample 5 is completed.

As mentioned above, after the positional adjustment of the sample 5 is completed, the surface to be inspected 5a is set within the coherence range 6 shown in FIG. 1. Thereafter, the sample position adjusting light source section 31 is evacuated from the optical system, and the observation light source section 11 is inserted into the optical system so as to start measuring the form of the surface to be measured 5a.

Without being restricted to the foregoing embodiment, the method of adjusting the sample position in the light wave interference apparatus in accordance with the present invention can be modified in various manners.

Here, the apparatus of the present invention is applicable not only to Michelson type interference apparatuses but also to other interference apparatuses, such as a Mach-Zehnder interference apparatus, in which the inspection light component and the reference light component can have substantially the same optical path length.

In accordance with the method of the present invention, when a sample position adjusting light source is inserted into the optical system, a light beam having a long coherence length, which has been turned into divergent light, is irradiated on each of the reference surface and the inspection surface, whereby spherical waves reach these two surfaces. Then, the reference light component and inspection light component, which are spherical waves respectively reflected by these surfaces, are recombined together by the beam splitter, thereby forming an interference fringe on the imaging surface of the CCD.

Since thus formed interference fringe is based on the interference of spherical waves by themselves, it comprises a pattern of a number of circles formed concentrically, in which the number of concentric circles reduces as the optical path difference between the reference light component and the inspection light component is smaller, such that the number of fringes theoretically becomes zero when the optical path difference between the reference light component and the inspection light component is zero.

When the optical path difference between the reference light component and the inspection light component is substantially zero, the surface to be inspected is located within the coherence range. Accordingly, when the sample is held at this position, an operation for measuring the form of the surface to be inspected by means of an observation light source with a short coherence length can be performed immediately thereafter.

Consequently, in a light wave interference apparatus using light with a short coherence length, the surface to be inspected can be easily set with a coherence range in a simple configuration.

What is claimed is:

1. A method of adjusting a position of a sample in a light wave interference apparatus, said light wave interference apparatus dividing an observation light beam having a coherence length shorter than twice thickness of said sample into two beams which are respectively irradiated onto a surface of said sample to be inspected and a reference surface, observing an interference fringe formed by an inspection light component from said surface to be inspected and a reference light component from said reference surface, and measuring, based on a result of observation, a surface form of said surface to be inspected;

wherein, when adjusting the position of said sample so as to dispose said surface to be inspected within a coherence range of said observation light beam, a divergent sample position adjusting light beam which has a coherence length greater than twice the thickness of said sample is used in place of said observation light beam to observe said interference fringe, and said sample is moved in an optical-axis direction until number of concentric fringes observed becomes a predetermined value or smaller.

2. A method according to claim 1, wherein, before moving said sample in the optical-axis direction, an operation for adjusting inclination of said sample so as to move center of said concentric interference fringe pattern to near the center of a visual field is performed.

3. A method according to claim 1, wherein, said predetermined value is zero.

* * * * *